Patented Aug. 7, 1951

2,562,884

UNITED STATES PATENT OFFICE 2,562,884

CHLORINATION OF CARBOHYDRATE ETHERS

Harold N. Barham, Manhattan, Kans., assignor to Sharples Chemicals Inc., a corporation of Delaware No Drawing. Application September 2, 1948, Serial No. 47,536

18 Claims. (Cl. 260—209)

This invention pertains generally to the chlorination of carbohydrate ethers. It pertains more particularly to a process for the chlorination of ethers of cellulose, of starch, and of the sugars, irrespective of carbon content, and to new chlorinated carbohydrate ether products, that is, chlorinated carbohydrate ether products in which the chlorine is chemically bound to the carbohydrate ether.

Examples of carbohydrate ethers to which my invention pertains are the saturated aliphatic ethers and the aromatic ethers of cellulose, such as methyl cellulose, ethyl cellulose, propyl cellulose, butyl cellulose, amyl cellulose, phenyl cellulose, and mixed ethers, for example, methylethyl cellulose, etc.; corresponding ethers of sugars such as, for example, methyl sucrose, methyl fructose, methyl lactose, methyl glucose, methyl galactose, methyl mannose, ethyl arabinose, ethyl galactose, etc. The foregoing terminology, for the sake of consistency, will be used in designation of all classes of carbohydrate ethers, rather than to add the conventional suffix "ide" to the sugars. Thus by methyl fructose is meant a methyl fructoside. Ethers (alkoxy or aryloxy derivatives) resulting from etherification of hydroxyl groups of carbohydrates generally may be employed, that is, ethers of starch (regardless of the source of the starch), of cellulose (regardless of the source of the cellulose) and of sugars, including monosaccarides, disaccarides, aldoses and ketoses, in their various isomeric forms. It will be understood that the carbohydrate ether molecule may have one or more alkoxy groups attached, such as may be obtained, for example, by the etherification of up to three hydroxyl groups on the glucoside units of cellulose or starch, but that all of the hydroxyl groups in any case need not be etherified. Thus cellulose ethers and starch ethers may have an average of only one (or less) hydroxy group per glucoside unit etherified or any other numerical average up to three. In the case of sucrose and glucose, neither of which, incidentally, exists in forms having different molecular weights such as is the case with cellulose and starch, one or more of the hydroxyl groups may be etherified; in the case of sucrose and maltose up to eight; in the case of glucose and fructose up to five; and in the case of xylose up to four.

As examples of such different degrees of etherification may be mentioned monomethyl cellulose, dimethyl cellulose, trimethyl cellulose, monomethyl starch, dimethyl starch, trimethyl starch, monomethyl sucrose to octamethyl sucrose, monomethyl glucose to pentamethyl glucose, monomethyl maltose to octamethyl maltose, monomethyl fructose to pentamethyl fructose, monomethyl xylose to tetramethyl xylose, and the corresponding ethyl, propyl, butyl and amyl ethers.

It will be understood that for practicable purposes, the degree of etherification as expressed above represents, in the case of cellulose and starch, an average figure for the number of ether groups present in the glucoside unit. This follows from the fact that practicable methods of preparation of cellulose and starch ethers tend to result in the formation of some units which contain a greater number of ether radicals than is represented by the average for the total product and, likewise, some which contain less than the average number. For example, ethyl cellulose available from a large commercial source contains an average of from 2.15 to 2.60 ethoxy groups per glucoside unit. This implies that some glucoside units contain 2 ethoxy groups or less while others contain 3 ethoxy groups. This statistical distribution of ether groups within the molecule or product taken as a whole is characteristic of all cellulose and starch ethers falling within the scope of this invention and having non-etherified hydroxyl groups.

Ethers derived from cellulose may vary considerably not only in respect to the number and size of the alkoxy groups present but also in respect to the average size of the molecules taken as a whole. Such ethers having a relatively long molecular chain are characterized, as is well known, by a relatively high viscosity, and those of somewhat shorter chain length are characterized by lower viscosities. This is also true of starch ethers. My chlorination process is applicable to cellulose ethers and starch ethers of all ranges of magnitude of the molecular chain.

Insofar as I am aware there is no known process whereby chlorinated derivatives of carbohydrate ethers have been obtained by reaction of the carbohydrate ether with chlorine, either in gaseous or liquid form, or by means of chlorinating agents such as $PCl_5$. Certain chlorine-containing derivatives of carbohydrate ethers, however, have been reported, but are obtained through entirely different chemical processes.

For convenience, I shall describe my invention more particularly in connection with the chlorination of cellulose ethers, such as ethyl cellulose, it being understood that similar procedures are applicable to carbohydrate ethers generally. Conditions of reaction, such as temperature and time, for optimum results in obtaining the degree of chlorination desired with minimum by-product formation, may vary somewhat with the carbohydrate ether undergoing treatment, but may be readily ascertained by the person skilled in the art upon becoming familiar herewith.

In the practice of my invention, chlorine in liquid phase is employed as the reagent, and the cellulose ether or other carbohydrate ether to be treated to produce the desired products is immersed in the liquid chlorine. Thus in the practice of the invention it is preferred that the cellulose ether be completely covered with liquid chlorine, since any cellulose ether extending above the liquid will be subjected to a vapor phase treatment resulting in products different in character.

Any means known in the art may be employed for maintaining the chlorine in liquid phase, such as self-induced pressure in a closed container, for example, an autoclave. Thus as long as the chlorine employed for chlorination purposes is maintained in the liquid phase, the super-atmospheric pressure in the zone of reaction may be at any desired level.

In the practice of my invention, cellulose ether is immersed in liquid chlorine, such as in an autoclave. The actual size of the cellulose ether sample is, of course, determined by the size and shape of the autoclave as is the amount of liquid chlorine required to immerse, or in other words, completely cover the cellulose ether, as is preferred for the reasons above set forth.

While is is usually preferred to treat the carbohydrate ether, for example, cellulose ether in a relatively pure and dry state, it is to be understood that impure cellulose ether, that is, cellulose ether in a partially purified state, may likewise be treated in the production of chlorinated cellulose ether products more or less contaminated with impurities due to the impurities present in the cellulose ether subjected to treatment. While substantially anhydrous carbohydrate ether, for example, carbohydrate ether containing less than 2% water by weight, is frequently preferred, moisture-containing carbohydrate ether such as carbohydrate ether containing up to 10% or even up to 25% by weight of water may also be treated. It is preferred that the amount of water in the zone of reaction not exceed about 25% based on the weight of carbohydrate ether initially present.

While any suitable temperature may be maintained in the reaction zone after the reactants have been combined, I usually prefer to employ temperatures between 20° C. and 100° C., and more particularly, between 30° C. and 90° C., in order that the reaction may proceed at a reasonable rate by having the temperature sufficiently high, and in order to avoid the production of excessive quantities of undesirable by-products by maintaining the temperature below the point at which excessive amounts of undesirable by-products are produced, such as by destructive decomposition.

The time of the reaction will obviously vary with the temperature, the reactivity of the carbohydrate ether under treatment, and the degree of chlorination desired. As an example, the treatment of a dry powdered ethyl cellulose for 2 hours in an autoclave at a final temperature of 90° C. in the reaction zone resulted in a chlorinated cellulose ether product containing approximately 57% by weight of chemically bound chlorine, which corresponds to an octachloride, that is, a chlorinated cellulose ether containing eight chlorine atoms per glucoside unit. At 50° C., eight hours were required to produce the pentachloride.

At the time of combining the reactants, I prefer, for purposes of insuring control of the reaction, to use temperatures in the reaction zone substantially below those at which the reaction itself is preferably conducted. Thus any danger of spontaneous and uncontrollable reaction may be avoided or reduced by initially cooling the reaction zone prior to the initial combining of the reactants therein to below 0° C., such as below −10° C. or −15° C., and maintaining such temperatures while the reactants are being initially combined. Precooling of the chlorine to any desired degree below room temperature, such as below 10° C. or 0° C., will assist in maintaining such initial combining temperatures. It is also preferable in bringing the reaction mixture to the reaction temperature to apply heat gradually, thus bringing about a relatively gradual increase in the temperature of the reactants. For example, increasing the temperature in the reaction zone at a rate below 1° C. per minute, such as below 0.5° C. per minute, and more particularly below 0.25° C. per minute, is satisfactory. After initial combination of chlorine with cellulose ether has occurred, as evidenced by an increase in pressure due to formation of hydrogen chloride, the temperature may suitably be elevated, such as above set forth. Higher initial temperatures and higher rates of heating may nevertheless be employed.

While the process may be carried out by operating batchwise, it lends itself to other types of treatment, such as, batch counter-current, or a treating procedure wherein liquid chlorine is made to flow through a body of carbohydrate ether under treatment with recycling of liquid chlorine, if desired, such as after the removal of HCl therefrom.

Since chlorine under the temperature of treatment has a substantial vapor pressure, chlorine is present in the vessel in both the liquid and vapor phases unless, of course, the vessel is completely filled with liquid.

In the case of impure carbohydrate ether, the impurities may be separated prior to treatment to any desired extent, or the chlorinated carbohydrate ether products may be purified to any desired extent after their production in accordance with my invention.

In the chlorination of carbohydrate ethers in accordance with my invention a variety of products may be obtained depending both upon the nature of the carbohydrate ether under treatment and upon the extent to which the chlorination is carried. In the event that the carbohydrate ether is completely etherified, thus containing no free hydroxyl groups, the chlorination is entirely a process of substitution of hydrogen atoms. The available hydrogen atoms on the alkyl groups may be substituted with chlorine atoms to a greater or lesser extent depending upon conditions employed; likewise the hydrogen atoms on the sugar or glucoside nucleus itself may be replaced by chlorine. On the other hand, when the carbohydrate ether under treatment is incompletely etherified, thus having hydroxyl groups present, both substitutive chlorination and oxidative chlorination may occur. Oxidation is believed to take place by removal of hydrogen atoms from the hydroxyl group and from the carbon atom to which the hydroxyl group is attached, with elimination of HCl and formation of carbonyl groups. In general, substitution of alkyl hydrogens occurs more readily than substitution of nuclear hydrogens.

The maximum amount of chlorine which may be introduced into the carbohydrate ether will depend somewhat on the number of available hydrogen atoms, and will thus be greater in the case, for example, of trialkyl celluloses than in the case of monoalkyl celluloses. Similarly more chlorine may be combined when the carbohydrate ether contains alkyl constituents of large molecular size as compared with those containing such constituents of smaller size.

Chlorinated carbohydrate ethers may be prepared containing an average of from 1 to several chemically combined chlorine atoms per sugar molecule or glucoside unit, for example, from 1 to 12 or more chlorine atoms per sugar unit. In the case of chlorinated sugar ethers, since these are simple molecular compounds, the minimum proportion of combined chlorine possible is, of course, 1 atom per molecule. On the other hand, chlorinated starch ethers and chlorinated cellulose ethers having useful and distinctive properties may be produced which contain substantially less than an average of 1 atom of chlorine per glucoside unit. Chlorinated starch and cellulose ethers having interesting properties have been prepared which contain from as little as 5% or less of chemically combined chlorine to as much as 70% or more of chemically combined chlorine.

Any desired degree of chlorination may be obtained by the simple expedient of cooling the reaction mixture to room temperature or below when the chlorine content of the product has reached the desired level.

In order to guard against destructive decomposition of the cellulose ether, I prefer to conduct the reaction, during the stage prior to the time that one chlorine atom per sugar ring becomes chemically bound, in such manner that the ratio of chlorine to hydrogen chloride in the zone of reaction, that is in the liquid phase, exceeds approximately 6 to 1, particularly when non-etherified hydroxyl groups are present in substantial amount. Any desired means may be employed for insuring this excess of chlorine, such as, the addition of further chlorine, the removal of hydrogen chloride, or any combination thereof, or otherwise. Subsequently the ratio of chlorine to hydrogen chloride is less critical.

While I prefer to employ substantially undiluted liquid chlorine in my process (except for such HCl and water, if present, as dissolves therein in the practice of the process), it is to be understood that a solvent for the chlorine or a non-solvent diluent may be present, particularly if such solvent or diluent is inert in the sphere of the reaction. Thus chlorine in solution might be employed, such as for example, a solution of chlorine in a non-polar solvent such as in carbon tetrachloride or in any other suitable solvent which is inert under the conditions obtaining in the chlorination reaction. The concentration of chlorine in any such solution preferably should be at least 50%, and more preferably at least 75%, such as, at least 90%.

For effective chlorination of the carbohydrate ether charged to the process, the state of subdivision of the carbohydrate ether should preferably be such as to permit the chlorine to intimately contact the same for reaction purposes as will be understood.

As pointed out above, after the cellulose ether and liquid chlorine are charged to the process, which, for convenience, is usually at temperatures at or below 0° C., it is preferred that the charge be brought up to temperature for chlorination purposes slowly in order to control the rate of reaction and the rate of heat evolution.

The reaction is believed to occur, for the most part, in the liquid phase. Initially the carbohydrate ether may be partially in undissolved form (unless initially dissolved in a solvent), but, as the reaction progresses, it becomes more soluble with the ultimate formation of a homogeneous or near homogeneous solution. The products are generally solids at room temperature varying in color from a light cream to yellow or brown. In most instances they are stable at ordinary temperatures and frequently at temperatures as high as 100° C. or higher.

They may be used as chemical intermediates, particularly in the manufacture of resins and plastics, and have value as constituents in film forming compositions such as are employed in the coating or sizing of paper, the water-proofing of textiles, etc. They show specific adsorption on cellulose to an unusual degree.

The following specific example illustrates the practice of my invention in the manufacture of chlorinated carbohydrate ethers generally:

*Example*

One-tenth of an equivalent (23.059 g.) of a dried, powdered ethyl cellulose having an average of 2.44 ethoxy groups per glucoside unit was introduced into a 1600 ml. glass lined autoclave of the rocking type. After the assembly was chilled to −23° C., 450 g. of liquid chlorine, precooled to a temperature of 6° C., was added. Rocking of the autoclave was then initiated and the autoclave with its contents were permitted to warm up gradually to room temperature. External heat was then applied sufficient to cause the reaction mixture to increase in temperature at a rate of 0.22° C. per minute until the temperature reached 90° C. This temperature was maintained for 2 hours. The autoclave and its contents were then cooled rapidly, and the volatile products were vented through water scrubbers in which the HCl was completely recovered for purposes of analysis. The remaining product was removed from the autoclave and more completely degassed under vacuum. The product was purified by dissolving it in chloroform and subsequently causing its precipitation by adding of petroleum ether. The precipitate was then dried under vacuum at about room temperature.

The product thus obtained was found by analysis to contain 56.68% chlorine, this corresponding approximately to eight chemically combined chlorine atoms per glucoside unit. It was found to melt without decomposition somewhat above room temperature and was stable at temperatures at least as high as 100° C. It was nearly white in color, was soluble in liquid chlorine, in chloroform and in absolute alcohol, but insoluble in water.

While in the foregoing specific example a catalyst was not present, it is to be understood that my invention contemplates the presence of a suitable catalyst, if desired, to speed up the reaction, or to cause the reaction to take place at a reasonable rate at a lower temperature, or otherwise.

While this invention has been described more particularly in connection with the chlorination of carbohydrate ethers as such, it is to be understood that it may be applied to the chlorination of substituted carbohydrate ethers, such as, cellulose ethers substituted with one or more carboxyl groups, of which carboxy methyl cellulose is an example.

The term "liquid chlorine" as used in the claims is intended to mean a liquid phase containing at least 50% $Cl_2$.

It will be understood that the above particular description is by way of illustration, and that changes, omissions, additions, substitutions and/or modifications may be made by persons skilled in the art, without departing from the spirit of the invention, which is intended to be limited only by the scope of the claims.

I claim:

1. A process for the chlorination of carbohydrate ether, comprising maintaining a carbohydrate ether immersed in liquid chlorine under super-atmospheric pressure until chemical reaction occurs by substitutive chlorination, resulting in evolution of hydrogen chloride.

2. A process for the chlorination of one of the group consisting of alkoxy and aryloxy derivatives of cellulose, comprising maintaining said cellulose ether immersed in liquid chlorine under super-atmospheric pressure until the substituted chlorine content of the cellulose ether reaches at least 5%.

3. A process for the chlorination of one of the group consisting of alkoxy and aryloxy derivatives of starch, comprising maintaining said starch ether immersed in liquid chlorine under super-atmospheric pressure until the substituted chlorine content of the starch ether reaches at least 5%.

4. A process for the chlorination of one of the group consisting of alkoxy and aryloxy derivatives of a sugar, comprising maintaining the sugar ether immersed in liquid chlorine under super-atmospheric pressure until the substituted chlorine content of the product reaches an average of at least about one chlorine atom per sugar molecule.

5. A process for the chlorination of one of the group consisting of alkoxy and aryloxy derivatives of cellulose, comprising maintaining said cellulose ether immersed in liquid chlorine under super-atmospheric pressure until the substituted chlorine content of the cellulose ether reaches a value between 5% and 70%, and maintaining in the zone of the reaction a molecular ratio of chlorine to hydrogen chloride of at least about 6:1 when the amount of combined chlorine in the cellulose ether is less than corresponds to an average of one chlorine atom per glucoside unit.

6. A process for the chlorination of one of the group consisting of alkoxy and aryloxy derivatives of cellulose comprising maintaining the cellulose ether immersed in liquid chlorine at a temperature between 20° and 100° C. until chemical combination between the cellulose ether and chlorine has occurred by substitution.

7. A process for the chlorination of alkyl cellulose in which each alkyl group contains from one to five carbon atoms, comprising maintaining said cellulose ether immersed in liquid chlorine at a temperature between 20° and 100° C. until chemical combination between said cellulose ether and chlorine has occurred, resulting in evolution of hydrogen chloride, and maintaining in the zone of the reaction a molecular ratio of chlorine to hydrogen chloride of at least about 6:1 when the amount of substituted chlorine in said cellulose ether is less than corresponds to one chlorine atom per glucoside unit.

8. The process of claim 1, but in which the reaction is carried out under substantially anhydrous conditions.

9. The process of claim 1, but in which the reaction is carried out in the presence of not more than 25% of water based on the weight of the carbohydrate ether initially present.

10. A chlorinated carbohydrate ether containing at least one substituted chlorine atom per sugar unit.

11. A chlorinated cellulose ether containing at least 5% by weight of substituted chlorine.

12. A chlorinated starch ether containing at least 5% by weight of substituted chlorine.

13. A chlorinated cellulose ether containing between about 5% and about 70% by weight of substituted chlorine.

14. A chlorinated sugar ether containing at least one substituted chlorine atom per sugar unit.

15. A chlorinated ethyl cellulose containing between 5% and 70% by weight of substituted chlorine.

16. The process of claim 2 in which the carbohydrate ether is ethyl cellulose containing an average of between one and three ethoxy groups per glucoside unit.

17. The process of claim 1 in which the reactants are initially combined at a temperature below 0° C.

18. The process of claim 17 in which the temperature is increased, after initial combining of the reactants, at a rate not exceeding 1° C. per minute, and in which the final temperature does not exceed 100° C.

HAROLD N. BARHAM.

REFERENCES CITED

The following references are of record in the file of this patent:

UNITED STATES PATENTS

| Number | Name | Date |
| --- | --- | --- |
| 1,864,554 | Reid | June 28, 1932 |
| 1,948,517 | Dreyfus | Feb. 27, 1934 |
| 2,073,052 | Dreyfus | Mar. 9, 1937 |
| 2,104,017 | Bradshaw | Jan. 4, 1938 |
| 2,422,572 | Lilienfeld | June 17, 1947 |
| 2,448,510 | Barham | Sept. 7, 1948 |
| 2,489,225 | Morris | Nov. 22, 1949 |

FOREIGN PATENTS

| Number | Country | Date |
| --- | --- | --- |
| 471,847 | Great Britain | Sept. 13, 1937 |